US 9,485,382 B2

(12) United States Patent
Ohzawa (10) Patent No.: US 9,485,382 B2
(45) Date of Patent: Nov. 1, 2016

(54) LIGHT GUIDE, ILLUMINATING DEVICE, AND IMAGE READING APPARATUS

(71) Applicant: KONICA MINOLTA, INC., Chiyoda-ku, Tokyo (JP)

(72) Inventor: Satoko Ohzawa, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/993,490

(22) Filed: Jan. 12, 2016

(65) Prior Publication Data

US 2016/0212294 A1 Jul. 21, 2016

(30) Foreign Application Priority Data

Jan. 20, 2015 (JP) ................................. 2015-008542

(51) Int. Cl.
*H04N 1/04* (2006.01)
*F21V 8/00* (2006.01)
*H04N 1/10* (2006.01)

(52) U.S. Cl.
CPC .......... *H04N 1/0461* (2013.01); *G02B 6/0001* (2013.01); *H04N 1/1061* (2013.01)

(58) Field of Classification Search
CPC . H04N 1/0461; H04N 1/1061; G02B 6/0001
USPC ............ 358/484, 475, 509; 250/227.11, 216; 399/220, 221
See application file for complete search history.

(56) References Cited

U.S. PATENT DOCUMENTS

| | | | |
|---|---|---|---|
| 8,279,499 B2 | 10/2012 | Wilsher | |
| 2014/0313738 A1* | 10/2014 | Tanaka ................... | G02B 6/001 362/298 |
| 2015/0181070 A1* | 6/2015 | Tanaka ................... | G02B 6/001 358/475 |

FOREIGN PATENT DOCUMENTS

JP 2014-187444 A 10/2014

* cited by examiner

*Primary Examiner* — Cheukfan Lee
(74) *Attorney, Agent, or Firm* — Buchanan Ingersoll & Rooney PC (57) ABSTRACT

A light guide having: a splitting section dividing light derived from a light source into at least two beams of light; and at least two light guiding sections causing the light from the splitting section to propagate in a predetermined length direction, the light guiding sections being arranged side by side in a predetermined width direction with the splitting section disposed therebetween, wherein the light guiding section includes: a reflective section reflecting the light, the reflective section being provided along the length direction; and an emission surface emitting the light reflected by the reflective section as a linear beam of light, the emission surface being positioned opposite to the reflective section, and a cross section of the splitting section perpendicular to the length direction decreases in dimensions both in the width direction and a height direction.

15 Claims, 11 Drawing Sheets

| POSITION IN LENGTH-DIRECTION | EMBODIMENT | COMPARATIVE EXAMPLE |
|---|---|---|
| x3 | | |
| x2 | | |
| x5 | | |
| x4 | | |

LIGHT GUIDE, ILLUMINATING DEVICE, AND IMAGE READING APPARATUS

This application is based on Japanese Patent Application No. 2015-8542 filed on Jan. 20, 2015, the content of which is incorporated herein by reference.

BACKGROUND OF THE INVENTION

1. Field of the Invention

The present invention relates to a light guide for generating a plurality of linear beams from light emitted by a light source, and the invention also relates to an illuminating device using the light guide and an image reading apparatus using the same.

2. Description of Related Art

Examples of the aforementioned light guide include those described in Japanese Laid-Open Patent Publication No. 2014-187444 and U.S. Pat. No. 8,279,499. Such a conventional light guide is opposed at one end surface to a light source. Incident light from the light source is split by a splitting section and introduced into a plurality of rod-like light guiding sections arranged side by side widthwise. The introduced light propagates through each of the rod-like light guiding sections lengthwise while repeatedly experiencing total reflection within the light guiding section.

Furthermore, each rod-like light guiding section is provided on the bottom with a reflective section (e.g., a group of prisms) capable of reflecting the introduced light upward. Moreover, the rod-like light guiding section has an emission surface provided on the top so as to be opposed to the reflective section. The emission surface is designed so as to turn the introduced light from, for example, the opposing reflective section into a linear beam and direct the beam to a predetermined position.

However, in the conventional light guide, the splitting section and the rod-like light guiding sections are simply connected at an angle, so that the splitting section and the light guiding sections allow the light to propagate in different directions. Accordingly, the light introduced from light-receiving ends of the rod-like light guiding sections is, for example, uneven in light intensity in the width direction of the light guide, as shown in, for example, FIG. 12 of Japanese Laid-Open Patent Publication No. 2014-187444. Therefore, to preclude such uneven light intensity of the conventional light guide, it is necessary to lengthen the rod-like light guiding sections, thereby achieving a sufficient entrance length.

Furthermore, in the case where a sufficient entrance length is not ensured, even if the reflective section is disposed at the light-receiving end of each rod-like light guiding section, light might not be incident on the reflective section in a desired manner. As a result, cross-sectional light distribution at the light-receiving end becomes irregular compared to the rest of the rod-like light guiding section.

SUMMARY OF THE INVENTION

A light guide according to an embodiment of the present invention includes: a splitting section dividing light derived from a light source into at least two beams of light; and at least two light guiding sections causing the light from the splitting section to propagate in a predetermined length direction, the light guiding sections being arranged side by side in a predetermined width direction with the splitting section disposed therebetween.

The light guiding section includes: a reflective section reflecting the light, the reflective section being provided along the length direction; and an emission surface emitting the light reflected by the reflective section as a linear beam of light, the emission surface being positioned opposite to the reflective section, and a cross section of the splitting section perpendicular to the length direction decreases in dimensions both in the width direction and a height direction, when progressively viewed at least at some positions in the length direction, the height direction being a component of a direction in which the linear beam of light is emitted from the emission surface, the component being vertical to the length direction and the width direction.

Other embodiments of the present invention are directed to an illuminating device using the light guide and an image reading apparatus using the same.

DETAILED DESCRIPTION OF THE PREFERRED EMBODIMENTS

First Section

Embodiment

Hereinafter, a light guide according to an embodiment of the present invention will be described with reference to the drawings, along with an illuminating device including the light guide and an image reading apparatus including the same.

Second Section

Definitions

In some figures, the x-axis represents a direction x pointing from the front of the image reading apparatus 1, the illuminating device 2, or the light guide 3 to the back (i.e., the length direction). In addition, the x-axis also represents a main scanning direction x for the image reading apparatus 1, for example. Further, the x-axis also represents an optical axis direction x for a light source 21, a length direction x for light guiding sections 31 and 32, or a longitudinal direction x for linear beams L3 and L4.

Furthermore, the y-axis represents a direction y pointing from the left of the image reading apparatus 1, the illuminating device 2, or the light guide 3 to the right (i.e., the width direction). In addition, the y-axis represents a sub-scanning direction y for the image reading apparatus 1, for example, and also represents a direction y in which the light guiding sections 31 and 32 are arranged side by side.

Furthermore, the z-axis represents a direction z pointing from the bottom of the image reading apparatus 1, the illuminating device 2, or the light guide 3 to the top (i.e., the height direction). The height direction z is also a component of the direction in which the linear beams L3 and L4 are emitted from emission surfaces 316 and 326 (see particularly FIG. 3), i.e., the component is vertical to both the length direction x and the width direction y.

Third Section

Configuration of Image Reading Apparatus

Figure 1:
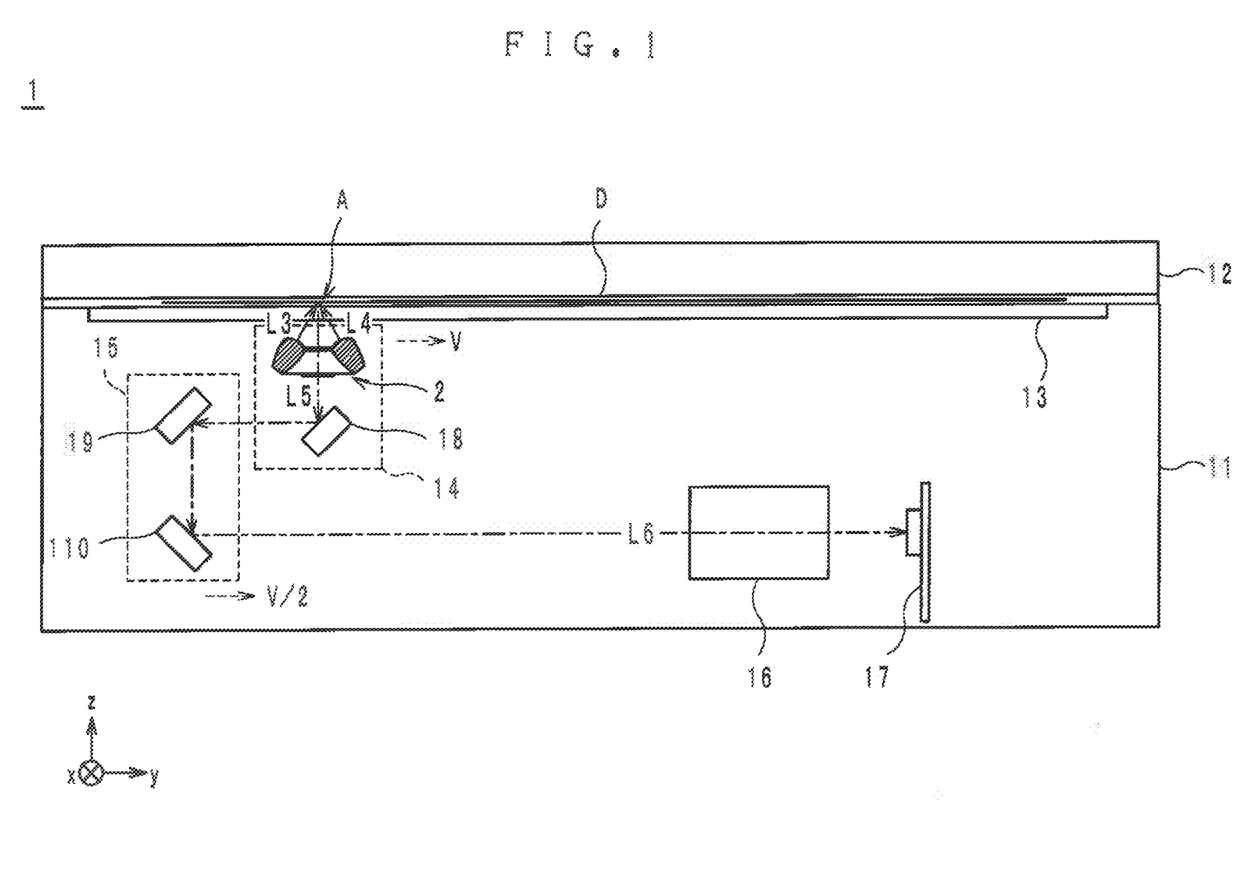
FIG. 1 is a schematic diagram illustrating a general configuration of an image reading apparatus.
Figure 2:
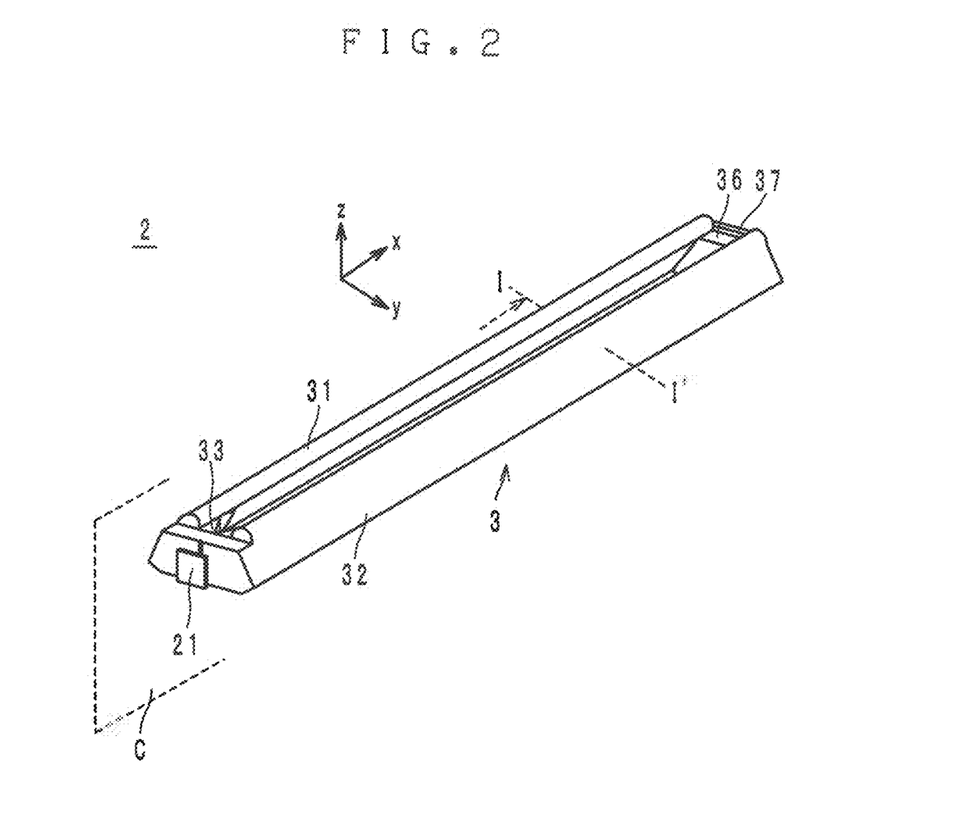
FIG. 2 is an oblique view of an illuminating device shown in FIG. 1.

In FIG. 1, the image reading apparatus 1 includes a housing 11, a document cover 12, a platen glass 13, a first slider unit 14, a second slider unit 15, an imaging lens 16, a linear image sensor 17, the illuminating device 2, a first mirror 18, a second mirror 19, and a third mirror 110.

The slider units 14 and 15, the imaging lens 16, the linear image sensor 17, the illuminating device 2, and the mirrors 18, 19, and 110 are accommodated in the housing 11.

The housing 11 has an approximately rectangular opening provided in its top surface. The platen glass 13, which is in the form of a plate, is fitted in the opening. The platen glass 13 is intended for a document D to be placed on its top surface with the side to be read facing down.

The document cover 12 is provided on top of the housing 11 and can be opened and closed so as to be placed on the document D when the user manually closes the document cover 12.

The illuminating device 2 is provided below the platen glass 13, as shown in FIG. 1. The illuminating device 2 includes the light source 21 and the light guide 3, as shown in FIGS. 2 to 7, and the light guide 3 generates a plurality of linear beams L3 and L4 from light L0 emitted by the light source 21, and emits the linear beams L3 and L4 from two places on the light guide 3 (i.e., the two emission surfaces 316 and 326 to be described later). The linear beams L3 and L4 illuminate the document D on the platen glass 13 in a reading area A, as shown in FIG. 1. The reading area A herein refers to an area of the document D which is equivalent to one line in the main scanning direction x.

The mirrors 18, 19, and 110 guide reflection light L5 from the document D (indicated by long-dashed short-dashed lines) to the imaging lens 16.

Here, the illuminating device 2 and the mirror 18 are provided on the first slider unit 14. When the document D is read, the first slider unit 14 carries the illuminating device 2 and the mirror 18 at a speed of V along the bottom surface of the platen glass 13 in the sub-scanning direction y.

The mirrors 19 and 110 are provided on the second slider unit 15. During the reading operation, the second slider unit 15, which is positioned slightly lower than the bottom surface of the platen glass 13, carries the mirrors 19 and 110 at a speed of V/2 in the sub-scanning direction y. This carrying action keeps the optical path for the reflection light from the document D constant up to the linear image sensor 17 during the reading operation. Moreover, the carrying action allows the illuminating device 2 to irradiate all reading areas A of the document D with the linear beams L3 and L4 while moving in the sub-scanning direction y.

The imaging lens 16 passes reflection light L6 from the mirror 110, thereby forming an image on the linear image sensor 17. The linear image sensor 17 converts the image from the light L6 on its receiving surface to electrical signals representing the three primary colors of light for each line of the document D in the main scanning direction x. As mentioned above, the illuminating device 2 irradiates the reading area A of the document D with the linear beam L4 in the sub-scanning direction y and the linear beam L3 in the opposite direction, and therefore, shadows are unlikely to be cast on the document D.

Fourth Section

Configuration Details of Illuminating Device

Next, the configuration of the illuminating device 2 will be described in detail. In FIGS. 2 to 6, the light source 21 is generally a light-emitting diode (LED) which emits white light L0. Furthermore, the light source 21 has a half-power angle of, for example, about 120 degrees. Here, the half-power angle is an angle between light components with 50% intensity where the intensity of a component of the light L0 emitted by the light source 21 in the optical axis direction x is 100%.

The light guide 3 has a length 1 of about 300 mm (see particularly FIG. 4), and is integrally made by injection molding with a transparent material having a high light transmission. An example of this type of material is poly (methyl methacrylate), i.e., PMMA. Alternatively, the light guide 3 may be made with glass. Moreover, the light guide 3 has a symmetrical shape with respect to a longitudinal median plane C. Here, the longitudinal median plane C is parallel to the zx-plane, and passes through the center of the light guide 3 in the width direction. Note that in FIG. 2, the longitudinal median plane C is shown only in part for the sake of clarity of the light guide 3.

Fifth Section

Configuration Details of Light Guide

Next, the configuration of the light guide 3 will be described in detail. The light guide 3 includes a left-side light guiding section 31, a right-side light guiding section 32, a splitting section 33, a left-side reflective section 34, a right-side reflective section 35, a coupling portion 36, and a rear-end reflective section 37, as shown in FIGS. 3 to 6.

The light guiding sections 31 and 32 are in the form of rods extending in the length direction x and being symmetrical to each other with respect to the longitudinal median plane C. Moreover, the light guiding sections 31 and 32 are arranged side by side in the width direction y with the splitting section 33 to be described later being interposed therebetween.

Figure 3:
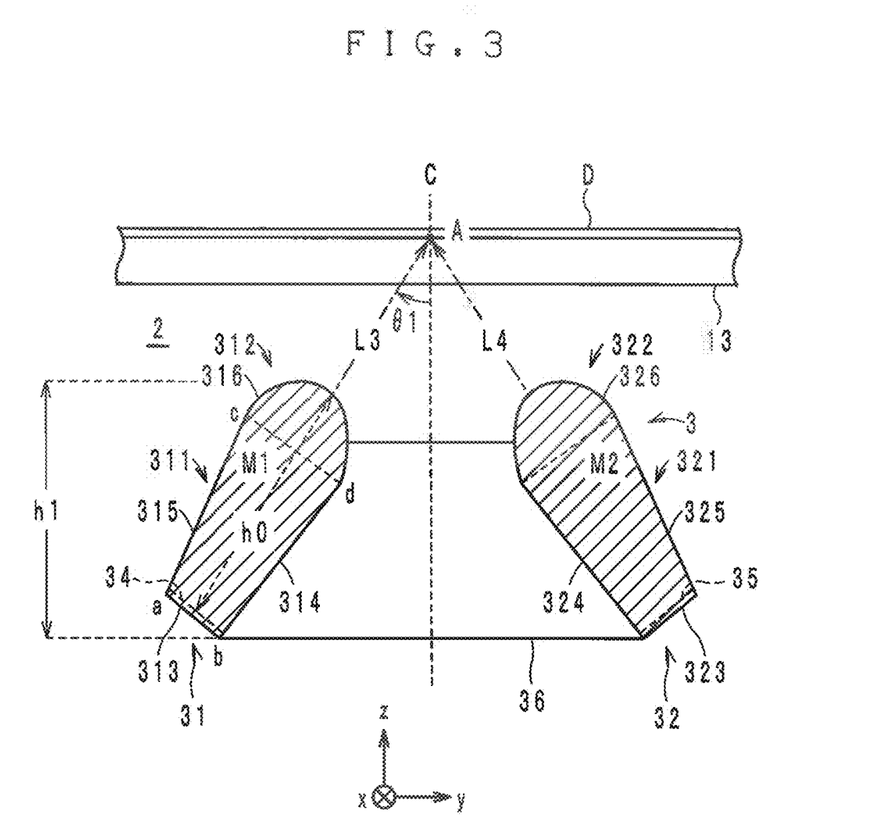
FIG. 3 is a cross-sectional view taken along line I-I' in FIG. 2, as seen in the opposite direction to the length direction.

In FIG. 3, the light guiding section 31 is shown in a cross section M1 taken along the yz-plane at an arbitrary position. For example, almost at any position in the length direction x, the cross section M1 has a shape connecting a trapezoidal portion 311 and an elliptical arc portion 312. The trapezoidal portion 311 has a short base a-b and opposite sides (i.e., legs of the trapezoid) a-c and b-d. Note that dotted line c-d is an imaginary line shared between the trapezoidal portion 311 and the elliptical arc portion 312, i.e., dotted line c-d represents a long base of the trapezoidal portion 311 and also a chord of the elliptical arc portion 312.

Furthermore, in the cross section M1, straight line h0 is inclined on the reading position A by angle θ1 to the longitudinal median plane C, and the trapezoidal portion 311 is positioned diagonally below the elliptical arc portion 312. In the present embodiment, for example, straight line h0 is a straight line passing through an approximate midpoint of the base a-b and the vertex of the elliptical arc portion 312. Moreover, the cross section M1 (i.e., the light guiding section 31) has a height h1 in the height direction z with respect to a predetermined reference point, which in this case is the lowest point of the light guiding section 31. In other words, the height h1 is a distance from the predetermined reference point to the highest point of the light guiding section 31.

As can be appreciated from the above description, the light guiding section 31 includes a bottom surface 313, an interior side surface 314, and an exterior side surface 315, all of which are rectangular, and the light guiding section 31 also includes the emission surface 316, which is a curved surface whose cross section forms the elliptical arc portion.

The light guiding section 31 has been described as having a shape whose cross section M1 is the same almost at any position in the length direction x. However, in an area extending a distance x1 of, for example, about 5 mm from the front end in the length direction x, the light guiding section 31 preferably has a flat top surface parallel to the xy-plane and flush with a primary surface S12 to be described later, as shown in the lower panel in FIG. 4.

The light guiding section 32 has a shape symmetrical to the light guiding section 31 with respect to the longitudinal median plane C, and is spaced apart from the light guiding section 31 in the width direction y. When looking at, for example, FIG. 3 from the reading position A downward, i.e., from top to bottom, the gap between the light guiding sections 31 and 32 starts increasing at some point. In other words, the light guiding sections 31 and 32 have their respective portions whose distance from each other in the width direction y increases opposite to the height direction z. Moreover, the light guiding section 32 has a bottom surface 323, an interior side surface 324, an exterior side surface 325, and the emission surface 326, which are respectively symmetrical to the bottom surface 313, the interior side surface 314, the exterior side surface 315, and the emission surface 316 with respect to the longitudinal median plane C.

Figure 4:
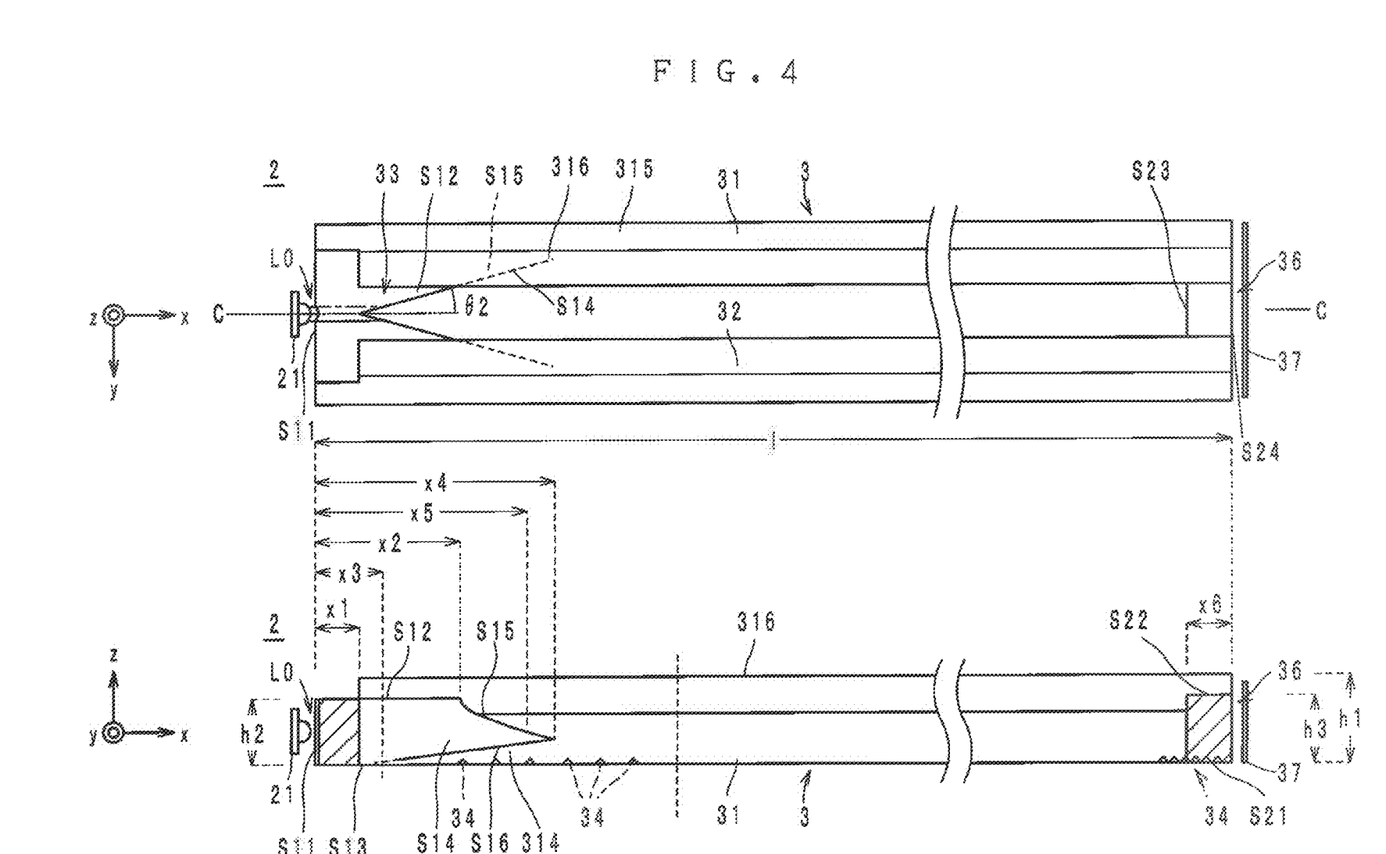
FIG. 4 illustrates the illuminating device shown in FIG. 2 where the upper panel shows a top view of the illuminating device, as seen in the opposite direction to the height direction, and the lower panel shows a cross-sectional view of the illuminating device taken along a longitudinal median plane, as seen in the opposite direction to the width direction.
Figure 5:
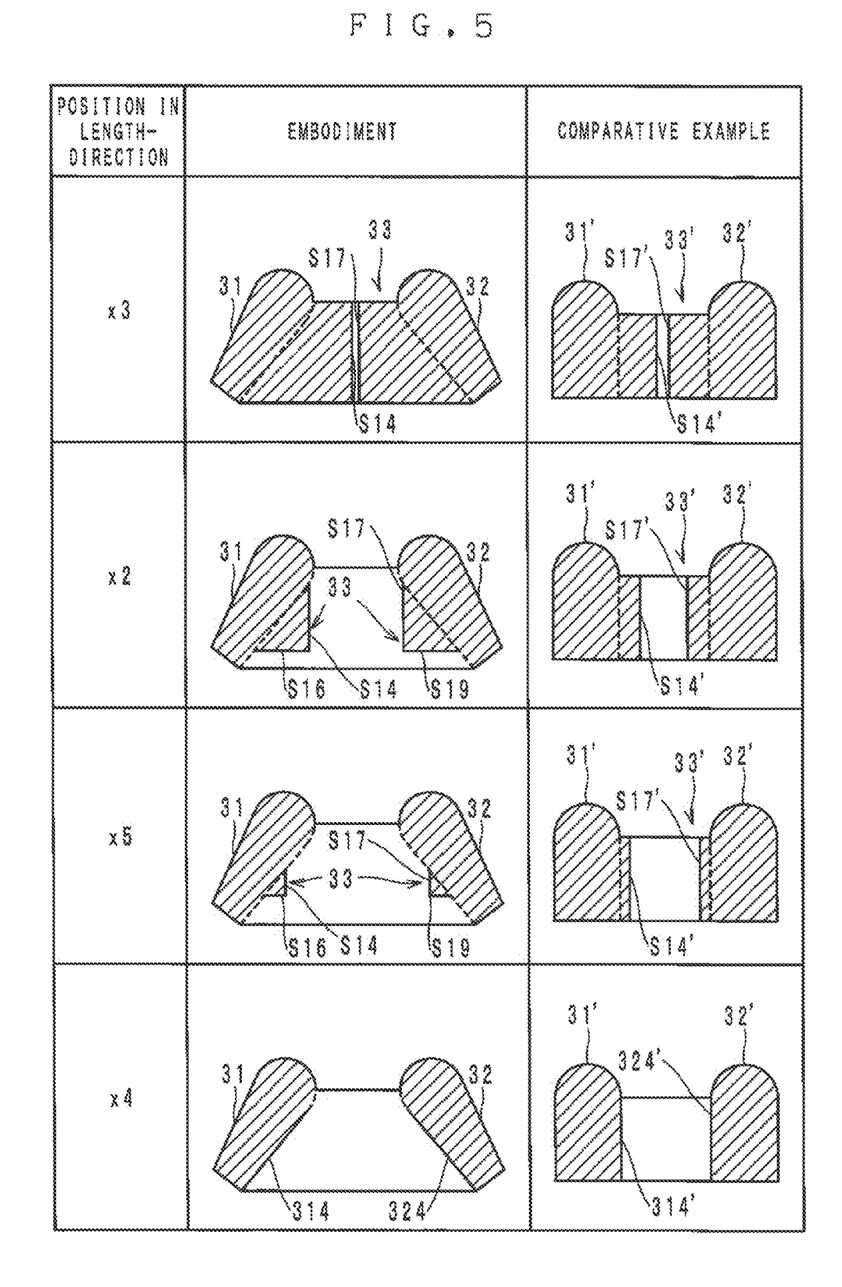
FIG. 5 is a diagram illustrating vertical cross-sections of splitting sections in the length direction, including various substantial portions of the splitting sections.

The splitting section 33 is provided between the front-end portions of the light guiding sections 31 and 32, as shown in FIGS. 4 and 5, and includes a light-receiving surface S11, a primary surface S12, a secondary surface S13, a left interior sloping surface S14, a left bottom sloping surface S16, a right interior sloping surface S17, and a right bottom sloping surface S19.

The light-receiving surface S11 is essentially flat and is flush with the front-end surfaces of the light guiding sections 31 and 32. The light source 21 is positioned so as to face the light-receiving surface S11, with its optical axis parallel to the front-back direction x on the longitudinal median plane C. To improve the use efficiency of the light L0 emitted by the light source 21, the light-receiving surface S11 is preferably designed to have an area sufficiently wide to be able to receive the entire light L0 emitted by the light source 21. The light-receiving surface S11 is preferably provided with a diffusing portion such as a groove extending in the height direction z. For details for the diffusing portion, see, for example, Japanese Laid-Open Patent Publication No. 2014-216688 (Japanese Patent Application No. 2013-090114).

Both the primary surface S12 and the secondary surface S13 are parallel to the xy-plane and are positioned on opposite sides in the height direction z. The secondary surface S13 is a bottom surface opposite to the primary surface S12 in the height direction z, and connects the front-end portions of the light guiding sections 31 and 32 to the bottom end of the light-receiving surface S11 and the bottom ends of the bottom sloping surfaces S16 and S19. On the other hand, the primary surface S12 is a top surface connecting the front-end portions of the light guiding sections 31 and 32 to the top end of light-receiving surface S11 and the top ends of the interior sloping surfaces S14 and S17 to be described later. The primary surface S12 is preferably provided at a position where the distance between the interior side surfaces 314 and 324 is shortest (see FIG. 3).

Here, the distance between the surfaces S12 and S13 is h2. The distance h2 is also the height of the primary surface S12 with respect to the aforementioned reference point (i.e., the bottom end of the light guiding section 31). Here, the height h2 is designed to be lower than the height h1, for example, such that h1−h2≈about 2 mm. Moreover, the end of the primary surface S12 in the length direction x is positioned at a distance x2 from the light-receiving surface S11 (see particularly the lower panel in FIG. 4). The distance x2 is designed so as to satisfy the relationship x1<x2<x4 (to be described later).

The left interior sloping surface S14, when viewed in a top view, extends from the "distance x1" mark on the optical axis at an angle θ2 counterclockwise to the longitudinal median plane C (see particularly the upper panel in FIG. 4). The top side of the sloping surface S14 extends parallel to the length direction x up to a point slightly short of the "distance x2" mark, and is bent diagonally downward at that point so as to extend along the interior side surface 314, as shown in the lower panel in FIG. 4. On the other hand, the bottom side of the sloping surface S14 extends diagonally upward at a point slightly short of the "distance x3" mark from the light-receiving surface S11, and meets the top side and the interior side surface 314 at a point slightly short of the "distance x4" mark from the light-receiving surface S11. Here, the distance x3 is designed so as to satisfy the relationship x1<x3<x2, and the distance x4 is designed so as to satisfy the relationship x2<x4. As can be appreciated from the foregoing, the sloping surface S14 is approximately perpendicular to the xy-plane, but more strictly, the sloping surface S14 is inclined at most at an angle equivalent to a draft angle for injection molding. This essentially renders the sloping surface S14 unable to vertically provide total reflection of light incident thereon, so that the primary surface S12 and other portions are prevented from emitting undesirable light therefrom. The left bottom sloping surface S16 connects the bottom side of the left interior sloping surface S14 and the light guiding section 31.

The right interior sloping surface S17 and the right bottom sloping surface S19 are shown in the left illustrated column in FIG. 5, and are respectively symmetrical to the left interior sloping surface S14 and the left bottom sloping surface S16 with respect to the longitudinal median plane C, and therefore, any detailed descriptions thereof will be omitted.

Here, cross-sectional shapes perpendicular to the length direction x at four substantial portions of the splitting section 33 (i.e., the cross-sectional shapes are parallel to the yz-plane) are shown in the left illustrated column in FIG. 5. More specifically, the cross-sectional shapes respectively at distances x3, x2, x5, and x4 from the light-receiving surface S11 are shown in the first, second, third, and fourth panels, from top, of the left illustrated column in FIG. 5. The distance x5 is greater than x2 but less than x4. As is apparent from the left illustrated column in FIG. 5, to look at the cross-sectional shape of the splitting section 33 at different positions in the length direction x, starting at a point slightly short of the distance x3 mark onward, the cross-sectional shape of the splitting section 33 decreases in dimensions and area both in the width direction y and in the height direction z, toward the light guiding sections 31 and 32.

Furthermore, for comparison, FIG. 5 shows in the right illustrated column cross-sectional shapes parallel to the yz-plane at four substantial portions of a splitting section 33' in which an interior side surface 314' of a light guiding section 31' and an interior side surface 324' of a light guiding section 32' are parallel to each other, and a left interior sloping surface S14' and a right interior sloping surface S17' have a constant height in the top-bottom direction z. To look at the cross-sectional shape of the splitting section 33' at different positions in the length direction x, starting at a point slightly short of the distance x3 mark onward, the splitting section 33' decreases in dimensions only in the width direction y.

Figure 6:
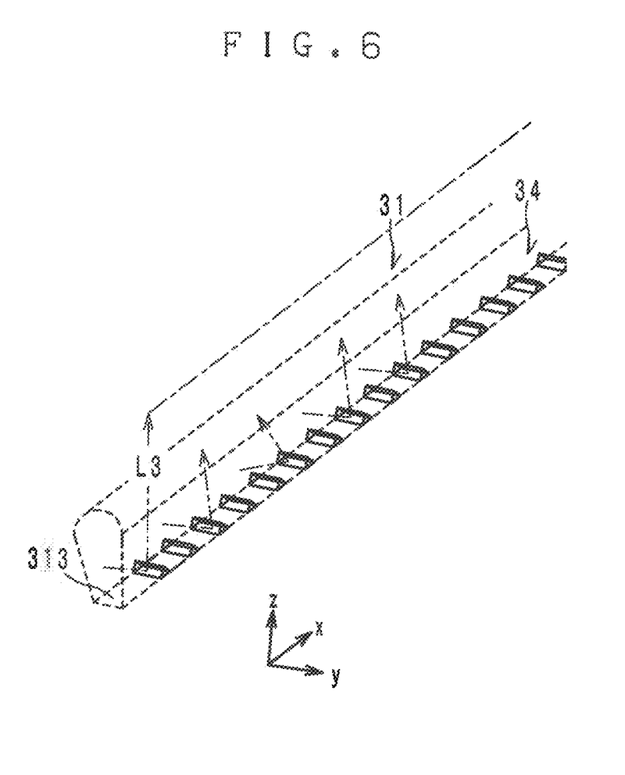
FIG. 6 is a diagram illustrating an example configuration of a first reflective section as shown in FIG. 4.

The reflective section 34 includes a number of prisms arranged in the front-back direction x on the bottom surface 313 of the light guiding section 31, as illustrated in FIGS. 4 and 6. Here, the end of the reflective section 34 in the opposite direction to the length direction x (i.e., the front-end portion) is positioned on the opposite side in the length direction x (i.e., on the front side) relative to the end of the splitting section 33 in the length direction x (i.e., the rear end); see particularly the lower panel in FIG. 4. Furthermore, the rear end of the reflective section 34 is located approximately at the same position as the rear end of the light guiding section 31.

Furthermore, although not shown for the sake of convenience, the reflective section 35 includes a number of prisms arranged so as to be plane-symmetrical to the prisms of the reflective section 34 with respect to the longitudinal median plane C. Accordingly, as in the case of the reflective section 34, the front end of the reflective section 35 is positioned on the front side relative to the rear end of the splitting section 33 (see particularly the lower panel in FIG. 4).

Furthermore, the reflective sections 34 and 35 are designed so as to achieve suitable light distribution characteristics of the linear beams L3 and L4 generated by the light guide 3. In the present embodiment, the term "suitable light distribution characteristics" refers to a state where the intensity of the linear beams L3 and L4 is higher at opposite ends in the length direction x than at the center.

The coupling portion 36 is disposed between the rear-end portions of the light guiding sections 31 and 32 in order to connect the rear-end portions. To this end, the coupling portion 36 includes a primary surface S21, a secondary surface S22, a front surface S23, and a rear surface S24.

The primary surface S21 and the secondary surface S22 are parallel to the xy-plane and opposite to each other in the height direction z. Furthermore, the surfaces S21 and S22 have a dimension x6 in the front-back direction x. The primary surface S21 connects the rear-end portion of the light guiding section 31, the rear-end portion of the light guiding section 32, the bottom end of the front surface S23, and the bottom end of the rear surface S24. On the other hand, the secondary surface S22 is positioned at a distance h3 (h3<h1) from the primary surface S21 in the height direction z, and connects the rear-end portions of the light guiding sections 31 and 32, the top end of the front surface S23, and the top end of the rear surface S24. The distance h3 is equal to the height of the secondary surface S22 with respect to the aforementioned reference point (i.e., the lowest point of the light guiding section 31). Here, the height h3 is lower than the height h1, and the heights h1 and h3 are designed so as to satisfy the relationship h3−h1≈2 mm.

Furthermore, the front surface S23 and the rear surface S24 are surfaces parallel to the yz-plane and opposite to each other in the length direction z, and are positioned between the rear-end portions of the light guiding sections 31 and 32. In contrast to the front surface S23, which connects the front ends of the primary surface S21 and the secondary surface S22, the rear surface S24 connects the rear ends of the surfaces S21 and S22. Note that the rear surface S24 is flat and flush with the rear-end surfaces of the light guiding sections 31 and 32.

The rear-end reflective section 37 is, for example, a white sheet-like member having approximately the same shape as the rear-end surface of the light guide 3 when viewed in a front view. The rear-end reflective section 37 as above is positioned so as to face the rear-end surface of the light guide 3.

Sixth Section

Generation and Emission of Linear Beam

Next, the process of the illuminating device 2 emitting the linear beams L3 and L4 will be described with reference to FIG. 7. First, the light L0 emitted by the light source 21 enters through the light-receiving surface S11 of the light guide 3. A portion of the light L0 having entered through the light-receiving surface S11 (i.e., high-intensity light along and close to the optical axis) propagates through the splitting section 33, and thereafter, mainly, the sloping surfaces S14 and S17 totally reflect the light, thereby splitting the light into two beams L1 and L2, which are respectively introduced into the light guiding sections 31 and 32. The rest of the light L0 having entered through the light-receiving surface S11 (i.e., low-intensity light distant from the optical axis) is directly introduced into the light guiding sections 31 and 32 as components of the beams L1 and L2 without being incident on the sloping surfaces S14 and S17.

Figure 7:
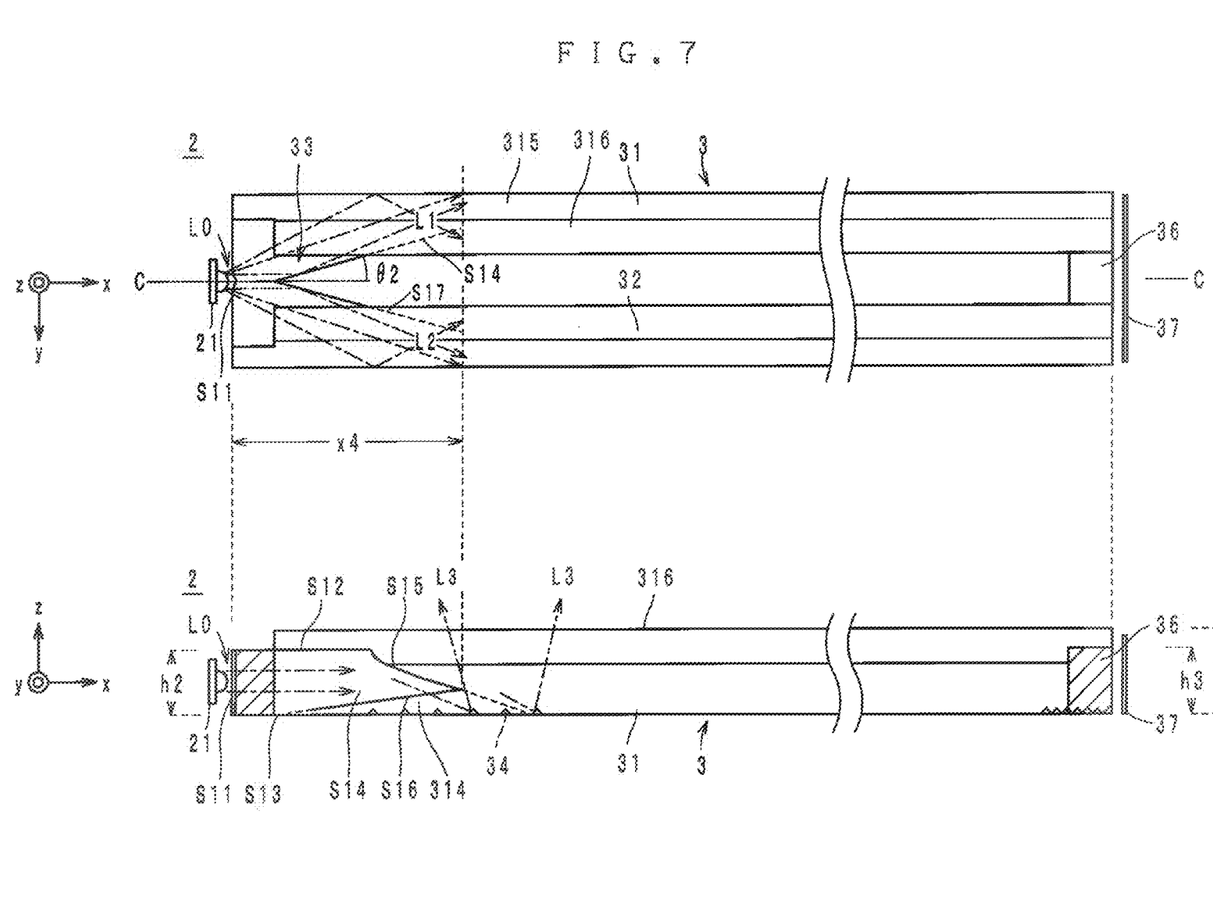
FIG. 7 is a diagram illustrating the process of a light guide shown in FIG. 2 emitting a linear beam.

In FIG. 7, the beams L1 and L2 having been introduced into the light guiding sections 31 and 32 are indicated by long-dashed short-dashed lines. More specifically, FIG. 7 shows the state where the high-intensity light L0 close to the optical axis has initially been split into the beams L1 and L2 by the sloping surfaces S14 and S17, and the beams L1 and L2 have reached the position x4 inside the light guiding sections 31 and 32. FIG. 7 also shows the low-intensity light L0 having propagated in directions different from the direction of the optical axis and directly reached the position x4 inside the light guiding sections 31 and 32 as components of the beams L1 and L2 without being split by the sloping surfaces S14 and S17. Also shown in FIG. 7 are other low-intensity light L0 having propagated in directions significantly deviating from the direction of the optical axis and reached the position x4 inside the light guiding sections 31 and 32 as components of the beams L1 and L2 after having been totally reflected once by the exterior side surfaces 315 and 325 of the light guiding sections 31 and 32 without being split by the sloping surfaces S14 and S17.

The beam L1 introduced into the light guiding section 31 propagates in the length direction x while repeatedly experiencing total reflection by boundary surfaces to the outside (mainly, the surfaces 314 to 316). During this process, some components of the introduced beam L1 are incident on the reflective section 34, which changes the propagation direction of the incident components so that the incident components propagate upward to the emission surface 316. The components of the beam L1 reflected by the reflective section 34 are incident on the emission surface 316 at an angle smaller than a critical angle of reflection, and therefore are emitted to the outside as components of the linear beam L3.

Furthermore, although not shown for the sake of convenience, the beam L2 introduced into the light guiding section 32, as with the beam L1 introduced into the light guiding section 31, propagates in the length direction x while repeatedly experiencing total reflection by boundary surfaces to the outside (mainly, the surfaces 324 to 326). During this process, some components of the beam L2 are incident on the reflective section 35, which changes the propagation direction of the incident components so that the incident components propagate upward to the emission surface 326. The components of the beam L2 are emitted to the outside as the linear beam L4.

As described above, the light guiding sections 31 and 32 emit the linear beams L3 and L4 from the emission surfaces 316 and 326. Here, the emission surfaces 316 and 326 are in the form of elliptical arcs when viewed in a front view, and therefore, the emitted beams L3 and L4 converge the reading position A. Note that some components of the beams L1 and L2 are guided to the rear ends of the light guiding sections 31 and 32 without being incident on the reflective sections 34 and 35, such components are reflected by the rear-end reflective section 37 and introduced back into the light guiding sections 31 and 32. Otherwise, the components guided to the rear ends of the light guiding sections 31 and 32 enter the light guiding sections 31 and 32 again through the coupling portion 36 and the rear-end reflective section 37.

Seventh Section

Actions and Effects of Light Guide and Other Components

As described above, in the present embodiment, because of the interior sloping surfaces S14 and S17 and the bottom sloping surfaces S16 and S19, the cross-sectional shape of the splitting section 33 decreases in size both in the width direction y and in the height direction z, when looking at the cross-sectional shape of the splitting section 33 at different positions in the length direction x, starting at a point slightly short of the distance x3 mark onward, as shown in the left illustrated column in FIG. 5. Therefore, in the case of the light guide 3, even at positions closer to the light-receiving surface S11, not just at the position of the rear end of the splitting section 33 at the distance x4, the interior side surface 314 of the light guiding section 31 is exposed to a greater extent compared to the configuration in the right illustrated column in FIG. 5. Therefore, total reflection of the beam L1 by the side surfaces 314 and 315 occurs within a very short distance from the light-receiving surface S11. Accordingly, in the case where light intensity distribution is observed for the cross section of the light guiding section 31 at the position x4, light intensity is generally uniform both inside and outside the light guiding section 31. The same can be said of the light guiding section 32.

Furthermore, it is possible to allow the splitting section 33 to terminate within a short distance in the length direction x, so that the interior side surfaces 314 and 324 of the light guiding sections 31 and 32 can be exposed within a short distance as well. Thus, the light guide 3 makes it easy to achieve suitable light distribution characteristics of emission light at the end in the length direction, and also renders it possible to generate the linear beams L3 and L4 with a shorter entrance length than conventional.

As opposed to the foregoing, in the case of the configuration in the right illustrated column in FIG. 5, an interior side surface 314' is not exposed within a short distance, and a sloping surface S14' has the same height at a point slightly short of the position x4 as at a point slightly short of the position x3. Therefore, when light intensity distribution is observed for the cross section of a light guiding section 31' at the position x4, light intensity inside the light guiding section 31' is low.

In this manner, the light guide 3 with the features described above renders it possible to inhibit uneven light intensity at the front-end portions (i.e., the receiving-side ends) of the light guiding sections 31 and 32.

The present inventor produced an illuminating device 2 according to the present embodiment and also a prototype thereof for comparison, which will be referred to below as an illuminating device 2" and is different from the illuminating device 2 in that the splitting section has a constant height up to its terminal end. Further, the inventor measured illuminance distribution for cross sections at the front-end portions of the light guiding sections 31 and 32 and also at the front-end portions of light guiding sections 31" and 32" of the illuminating device 2". The results are shown in FIG. 8.

Figure 8:
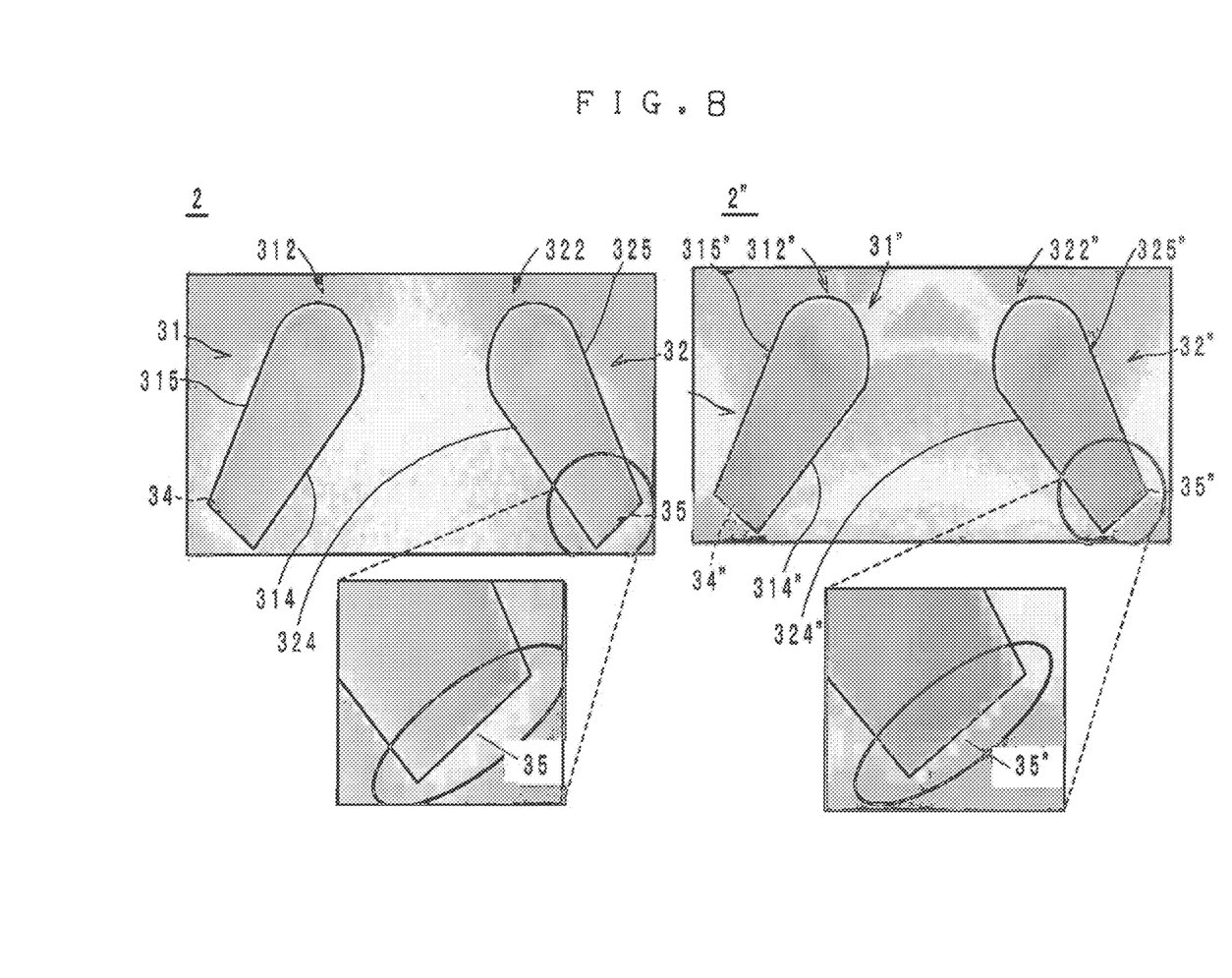
FIG. 8 provides images illustrating illuminance distribution at front-end portions of light guiding sections shown in FIG. 2.

In FIG. 8, illuminance distribution for the cross section at the front-end portions of the light guiding sections 31 and 32 is shown on the left side, and illuminance distribution for the cross section at the front-end portions of the light guiding sections 31" and 32" is shown on the right side. Furthermore, in FIG. 8, light- and dark-color portions respectively represent low and high luminance levels in the light guiding sections.

As shown on the left side in FIG. 8, although luminance was slightly low at the center of each of the elliptical arc portions 312 and 322, approximately uniform and high illuminance was achieved almost across the entire cross sections of the light guiding sections 31 and 32. As for some areas in the vicinity of the reflective sections 34 and 35, which are particularly important for the generation of the linear beams L3 and L4, illuminance was almost uniform both near the interior side surfaces 314 and 324 and near the exterior side surfaces 315 and 325.

On the other hand, as for the light guiding sections 31" and 32", illuminance distribution was uneven, and high illuminance areas were observed near exterior side surfaces 315" and 325", as shown on the right side in FIG. 8. Similar tendencies were observed near reflective sections 34" and 35" as well.

Eighth Section

Other Actions and Effects of Light Guide and Other Components

As described above, on the front side relative to the position x4, the height of the splitting section 33 is lower than the height of the light guiding sections 31 and 32 (see the lower panel in FIG. 4). Accordingly, the portions of the light guiding sections 31 and 32 that are higher than the height h2 reflect incident light without being affected by the splitting section 33. Thus, suitable light distribution characteristics of the linear beams L3 and L4 can be readily achieved at the end in the length direction.

Furthermore, the ends of the reflective sections 34 and 35 in the opposite direction to the length direction x (i.e., the front ends of the reflective sections 34 and 35) are located on the opposite side relative to the end of the splitting section 33 in the length direction x (i.e., the rear end of the splitting section 33). This allows the front-end portions of the light guiding sections 31 and 32 to better contribute to the generation of the linear beams L3 and L4. Thus, the light guide 3 renders it possible to generate the linear beams L3 and L4 using light guiding sections with a much shorter length than conventional.

Furthermore, the secondary surface S22 of the coupling portion 36 has a height lower than the vertices of the emission surfaces 316 and 326, and therefore, as in the above case, the linear beams L3 and L4 can be generated by means of the light guiding sections 31 and 32 with a further reduced length.

Furthermore, the emission surfaces 316 and 326 span approximately the entirety of the light guiding sections 31 and 32 in the length direction x, and therefore, the linear beams L3 and L4 can be generated by means of the light guiding sections 31 and 32 with a reduced length.

Ninth Section

Supplementary 1

Figure 9:
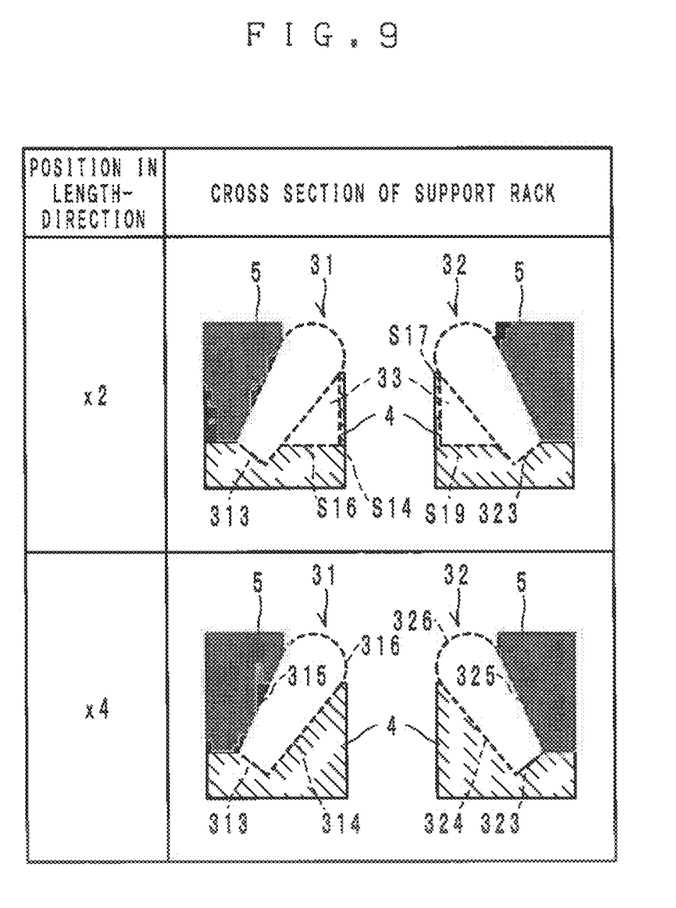
FIG. 9 provides cross-sectional views illustrating a support rack for the illuminating device in FIG. 2 and a light-shielding member for the light guiding sections.

In the illuminating device 2, the light guide 3 is supported by a support rack 4 as shown in the upper and lower panels in FIG. 9. Note that in FIG. 9, for easy viewing of the support rack 4, the light guiding sections 31 and 32 are outlined by broken lines. In a section located forward in the length direction x relative to the position x4, the support rack 4 supports the light guide 3 by contacting almost the entirety of the bottom surface 313 and the interior side surface 314 and also almost the entirety of the bottom surface 323 and the interior side surface 324 (see the lower panel in FIG. 9). On the other hand, in a section on the opposite side in the length direction x relative to the position x4, the support rack 4 supports the light guide 3 by contacting almost the entirety of the interior sloping surfaces S14 and S17 and the bottom sloping surfaces S16 and S19, as well as the bottom surfaces 313 and 323 (see the upper panel in FIG. 9). As described above, in the light guiding sections 31 and 32, basically, the beams L1 and L2 propagate in the length direction x while repeatedly experiencing total reflection, but it is envisaged that the beams L1 and L2 might escape to the outside through the bottom surfaces 313 and 323 and the interior side surfaces 314 and 324 due to scattering at boundary surfaces between the light guiding sections 31 and 32 and the outside or due to reflection/refraction by the reflective sections 34 and 35. Therefore, the surfaces of the support rack 4 that contact the bottom surfaces 313 and 323 and the interior side surfaces 314 and 324 are preferably covered with a white resin layer or a mirror surface.

Furthermore, almost the entirety of the exterior side surfaces 315 and 325, excluding the emission surfaces 316 and 326, are preferably covered by a light-shielding member 5, which is an optical absorber such as a black resin layer or a black tape, as shown in FIG. 9. Further, it is also preferable that the light-shielding member 5 uniformly covers the top surface of the splitting section 33, the flat front-end portions of the light guiding sections 31 and 32, and the secondary surface S22 of the coupling portion 36 as well, as shown in the upper and lower panels in FIG. 10. Note that in FIG. 10, the light-shielding member 5 is represented by hatching inclined downward to the right.

Here, considering irradiation efficiency for the document D, the light guide 3 is desirably disposed as close to the document D as possible while leaving some room for tolerance. In view of such background, as described above, the front-end portions of the light guiding sections 31 and 32 are set lower by about 2 mm than the height h1 to the vertices of the emission surfaces 316 and 326, and formed to be flat and have a width of about 5 mm in the length direction x. In this manner, by disposing the light-shielding member 5 on the flat portion where the emission surfaces 316 and 326 are not formed, it is rendered possible to cover the front-end portions of the light guiding sections 31 and 32 by the light-shielding member 5 while keeping the vertices of the emission surfaces 316 and 326 close to the document D.

Furthermore, it is also envisaged that due to the shape of the splitting section 33, the actual cross-sectional light distribution at the front-end portions of the light guiding sections 31 and 32 becomes broader than aimed for, with the result that the linear beams L3 and L4 include undesirable optical components. Accordingly, the light-shielding member 5 is formed in such a manner that the portions of the emission surfaces 316 and 326 that are proximal to the splitting section 33 are exposed in the width direction y less than other portions of the emission surfaces 316 and 326, as shown in the upper panel in FIG. 10. More specifically, in the present embodiment, the light-shielding member 5 is preferably formed such that the portions of the emission surfaces 316 and 326 up to the distance x4 (i.e., up to the rear-end portion of the splitting section 33) are relatively narrower in the size of exposure than the remaining portions of the emission surfaces 316 and 326 from the distance x4 onward. Here, the "size of exposure" refers to the dimension of the exposed portions, including the emission surface 316, in the width direction y when viewed in a top view.

The foregoing is not limiting, and the surfaces of the light guide 3, excluding the emission surfaces 316 and 326, may be covered by reflective sheets. In this case, components of the beams L1 and L2 that have escaped from the light guide 3 can be reused, so that the irradiation efficiency for the document D can be inhibited from being reduced.

The front-end portions of the light guiding sections 31 and 32 have been described as being flat and flush with the primary surface S12 of the splitting section 33. However, this is not limiting, and the front-end portions of the light guiding sections 31 and 32 may be sloping.

Figure 10:
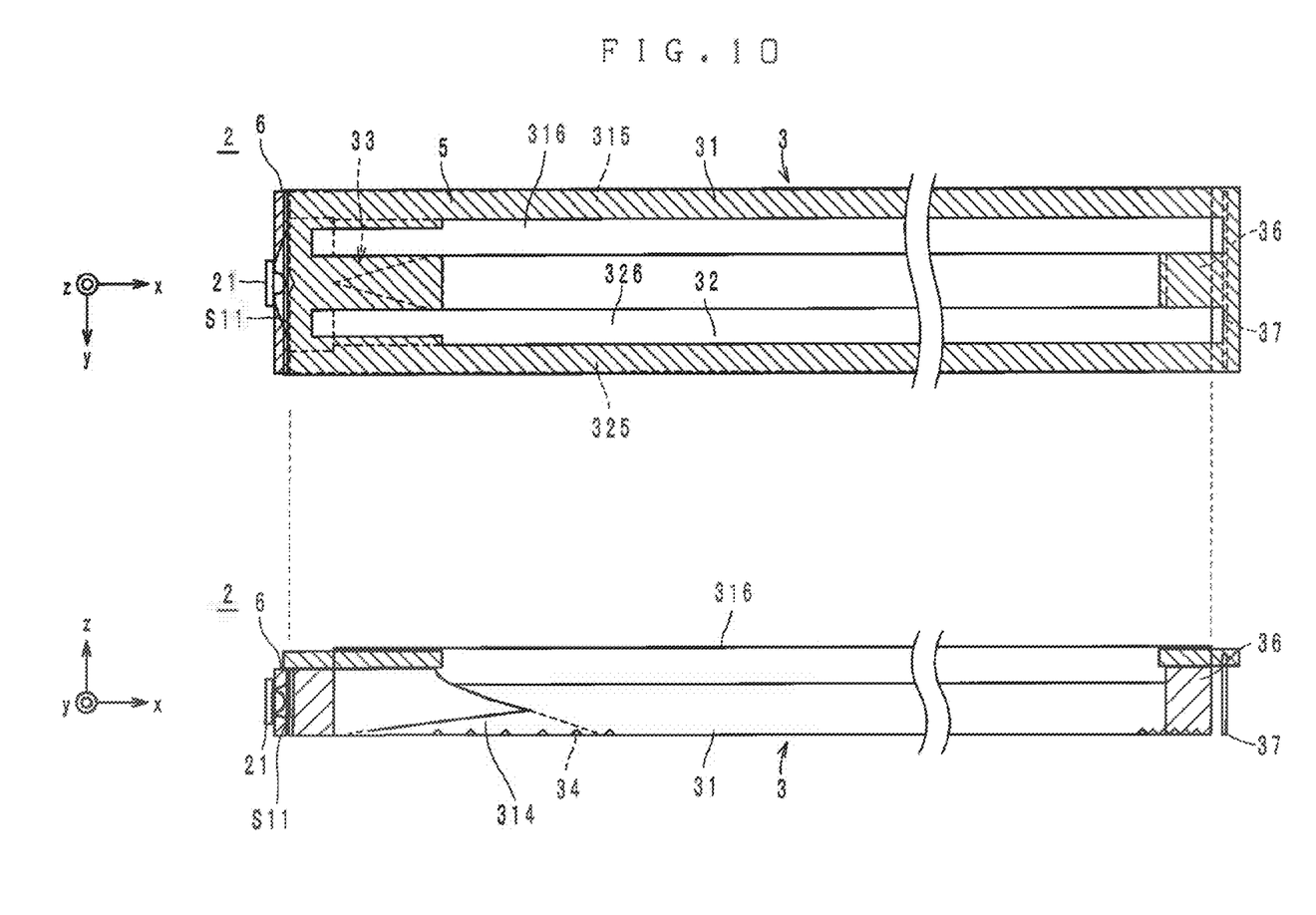
FIG. 10 provides a top view and a cross-sectional view illustrating the light-shielding member for the light guiding sections shown in FIG. 8.

To allow the entire emission light L0 to be incident on the light-receiving surface S11, the light source 21 may be positioned using a light-concentrating attachment 6 (see FIG. 10).

Furthermore, the light-receiving surface S11 does not have to be parallel to the yz-plane, and may be directed diagonally downward, for example.

In the above embodiment, the splitting section 33 divides the introduced light L0 into two beams. However, this is not limiting, and the splitting section 33 may divide the introduced light L0 into a number equal to the number of light guiding sections (e.g., three or four).

Figure 11:
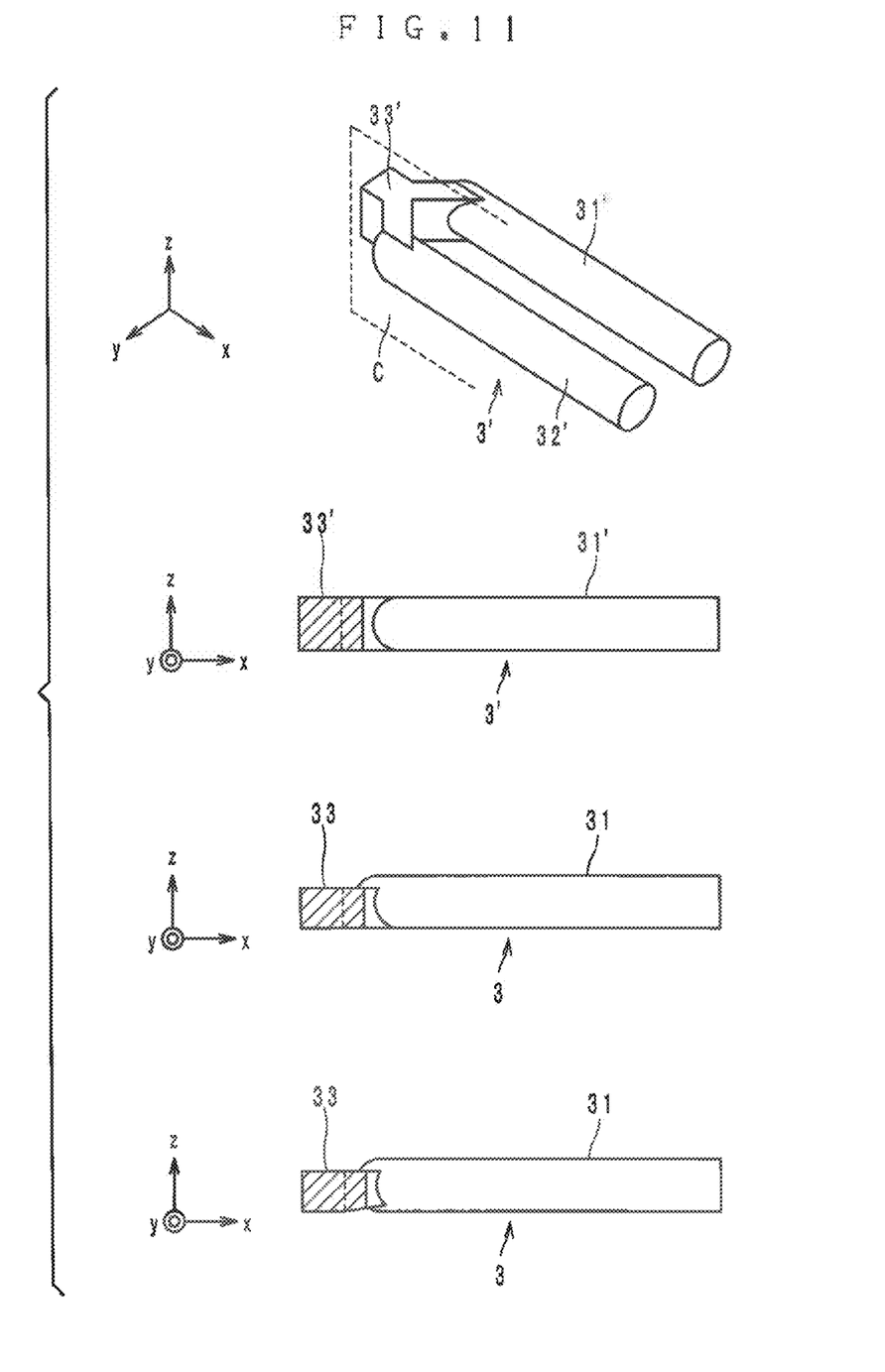
FIG. 11 is a diagram illustrating some modifications of the light guide shown in FIG. 2.

Furthermore, the cross section of the light guiding sections 31 and 32 is not limited to the shape shown in FIG. 3, and may be, for example, a circular shape without clear boundaries among the bottom surfaces, the side surfaces, and the emission surfaces, as shown in the third and fourth panels from top in FIG. 11. Note that for the sake of reference, the uppermost and second panels in FIG. 11 show a light guide 3' where the height of the splitting section 33' is the same as the height of the light guiding sections 31' and 32'. In the case of the circular cross section, the gap between the light guides 31' and 32' in the width direction y progressively increases in the height direction z, upward from the height of the centers of the light guides 31' and 32'. In addition, the gap between the light guides 31' and 32' in the width direction y progressively increases also opposite to the height direction z, downward from the height of the centers of the light guides 31' and 32'.

Even in the case of the circular cross section, when the height of the splitting section 33 is lower than the height of the light guiding sections 31 and 32, as shown in the third panel from top in FIG. 11, the top of the light guiding sections 31 and 32 can be exposed within a short distance. Therefore, the light guide 3 thus configured also makes it easy to achieve suitable light distribution characteristics of emission light at the end in the length direction while generating linear beams using light guiding sections with a shorter length than conventional.

Furthermore, effects similar to the above can be achieved also by shaping the bottom surface (primary surface) of the splitting section 33 so as to incline upward, as shown in the fourth panel in FIG. 11, and thereby terminating the splitting section 33 within a short distance in the length direction x.

It is also possible to shape the top surface (secondary surface) of the splitting section 33 so as to incline downward with the bottom surface of the splitting section 33 inclining upward, as shown in the fourth panel in FIG. 11. However, to ensure that the splitting section 33 is sufficiently wide for the light source 21, it is preferable to incline only one of either the top surface (secondary surface) or the bottom surface (primary surface) of the splitting section 33.

Although the present invention has been described in connection with the preferred embodiment above, it is to be noted that various changes and modifications are possible to those who are skilled in the art. Such changes and modifications are to be understood as being within the scope of the invention.

What is claimed is:

1. A light guide comprising:
a splitting section dividing light derived from a light source into at least two beams of light; and
at least two light guiding sections causing the light from the splitting section to propagate in a predetermined length direction, the light guiding sections being arranged side by side in a predetermined width direction with the splitting section disposed therebetween, wherein,
the light guiding section includes:
a reflective section reflecting the light, the reflective section being provided along the length direction; and
an emission surface emitting the light reflected by the reflective section as a linear beam of light, the emission surface being positioned opposite to the reflective section, and
a cross section of the splitting section perpendicular to the length direction decreases in dimensions both in the width direction and a height direction, when progressively viewed at least at some positions in the length direction, the height direction being a component of a direction in which the linear beam of light is emitted from the emission surface, the component being vertical to the length direction and the width direction.

2. The light guide according to claim 1, wherein the splitting section includes two interior sloping surfaces splitting the light derived from the light source into two beams of light, the two interior sloping surfaces being approximately parallel to each other in the height direction and plane-symmetrical to each other with respect to a longitudinal median plane passing through an approximate center of the splitting section in the width direction and being approximately parallel to both the length direction and the height direction, the two interior sloping surfaces being spaced apart with a gap in the width direction progressively increasing in the length direction.

3. The light guide according to claim 1, wherein,
the splitting section includes a primary surface being an end surface directed in the height direction, and
the light guide further comprises a light-shielding member blocking at least light emitted from the primary surface.

4. The light guide according to claim 1, wherein the splitting section includes a primary surface being an end surface directed in the height direction and provided at a position where the light guiding sections are at a minimum distance from each other in the width direction.

5. The light guide according to claim 4, further comprising a light-shielding member being formed in such a manner that a portion of the emission surface that is proximal to the splitting section is exposed in the width direction less than other portions of the emission surface.

6. An illuminating device comprising:
a light source; and
the light guide of claim 1.

7. The illuminating device according to claim 6, wherein the splitting section includes two interior sloping surfaces splitting the light derived from the light source into two beams of light, the two interior sloping surfaces being approximately parallel to each other in the height direction and plane-symmetrical to each other with respect to a longitudinal median plane passing through an approximate center of the splitting section in the width direction and being approximately parallel to both the length direction and the height direction, the two interior sloping surfaces being spaced apart with a gap in the width direction progressively increasing in the length direction.

8. The illuminating device according to claim 6, wherein,
the splitting section includes a primary surface being an end surface directed in the height direction, and
the light guide further comprises a light-shielding member blocking at least light emitted from the primary surface.

9. The illuminating device according to claim 6, wherein the splitting section includes a primary surface being an end surface directed in the height direction and provided at a position where the light guiding sections are at a minimum distance from each other in the width direction.

10. The illuminating device according to claim 9, further comprising a light-shielding member being formed in such a manner that a portion of the emission surface that is proximal to the splitting section is exposed in the width direction less than other portions of the emission surface.

11. An image reading apparatus comprising:
the illuminating device of claim 6; and
an image pickup element receiving light emitted from the light source after the light irradiates a document.

12. The image reading apparatus according to claim 11, wherein the splitting section includes two interior sloping surfaces splitting the light derived from the light source into two beams of light, the two interior sloping surfaces being approximately parallel to each other in the height direction and plane-symmetrical to each other with respect to a longitudinal median plane passing through an approximate center of the splitting section in the width direction and being approximately parallel to both the length direction and the height direction, the two interior sloping surfaces being spaced apart with a gap in the width direction progressively increasing in the length direction.

13. The image reading apparatus according to claim 11, wherein,
the splitting section includes a primary surface being an end surface directed in the height direction, and
the light guide further comprises a light-shielding member blocking at least light emitted from the primary surface.

14. The image reading apparatus according to claim 11, wherein the splitting section includes a primary surface being an end surface directed in the height direction and provided at a position where the light guiding sections are at a minimum distance from each other in the width direction.

15. The image reading apparatus according to claim 14, further comprising a light-shielding member being formed in such a manner that a portion of the emission surface that is proximal to the splitting section is exposed in the width direction less than other portions of the emission surface.

* * * * *